United States Patent [19]

Headley et al.

[11] 4,437,738
[45] Mar. 20, 1984

[54] OPTICAL ROLLFICHE READER

[75] Inventors: James E. R. Headley, 2516 Canyon View La., Pasadena, Calif. 91107; William R. Limburg, Torrance, Calif.; Robert A. Nordmeyer, Woodland Hills, Calif.; Jay Smith, III, Santa Monica, Calif.

[73] Assignees: Henry Frank Yoder, III; Donald Yoder, both of Tustin, Calif.; Arthur B. Willis, deceased, Los Angeles, Calif. ; Title Insurance and Trust Company, executor; Dean S. Butler; John A. Fusco, both of Whittier, Calif.; Peter K. Adler, Fairfax, Va.; James E. Headley, Monterey Park, Calif. ; a part interest

[21] Appl. No.: 254,748

[22] Filed: Apr. 16, 1981
(Under 37 CFR 1.47)

Related U.S. Application Data

[63] Continuation of Ser. No. 141,456, Apr. 18, 1980, abandoned.

[51] Int. Cl.³ .................... G03B 23/12; G03B 21/22
[52] U.S. Cl. ................ 353/26 R; 353/27 A; 353/78; 353/101; 242/75.42; 242/75.44; 242/67.4; 242/191; 242/204

[58] Field of Search ............ 353/25, 26 A, 26 R, 353/27 R, 74, 76, 77, 78, 101, 122; 350/117, 129, 124; 242/156.2, 186, 191, 75.42, 204, 75.43, 75.44, 201, 67.4

[56] References Cited
U.S. PATENT DOCUMENTS

| | | | |
|---|---|---|---|
| Re. 27,617 | 4/1973 | Olsen | 428/114 |
| 1,992,912 | 2/1935 | La Mater | 242/156.2 X |
| 3,079,100 | 2/1963 | Brown et al. | 242/156.2 X |
| 3,700,321 | 10/1972 | Peters | 353/26 R |
| 3,972,593 | 8/1976 | Appledorn | 350/211 |
| 4,082,433 | 4/1978 | Appledorn | 350/211 |

Primary Examiner—Steven L. Stephan
Attorney, Agent, or Firm—Whann & McManigal

[57] ABSTRACT

An optical film reader for projecting and enlarging micro copy information recorded in rollfiche format on rolls of photographic film or the like which provides a film transport mechanism enabling rapid manual scanning of the enclosed rollfiche strip in both directions, with instantaneous reversal of the scanning direction without backlash in the film drive. A low glare, high contrast viewing screen is mounted at 45° to the vertical and placed low at the front of the unit perpendicular to the viewer's line of sight. Movable projection optics are provided for scanning of rollfiche microcopy which is wider than that projectable on a fixed sized screen at one given time at a given magnification ratio; the movable projection optics allow projection of the micro copy data or eye-readable index area of the rollfiche by means of a single scanning lever.

19 Claims, 12 Drawing Figures

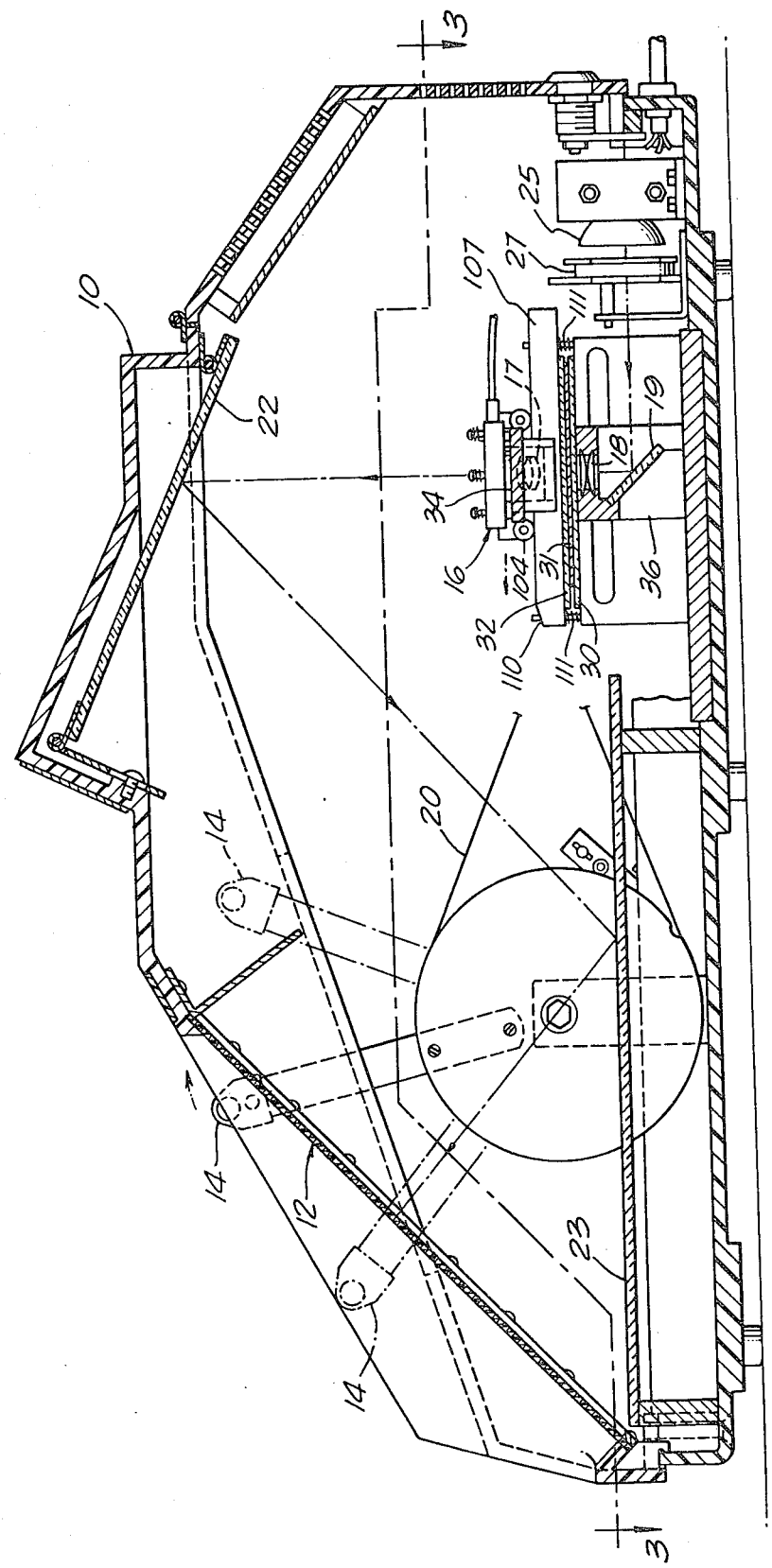

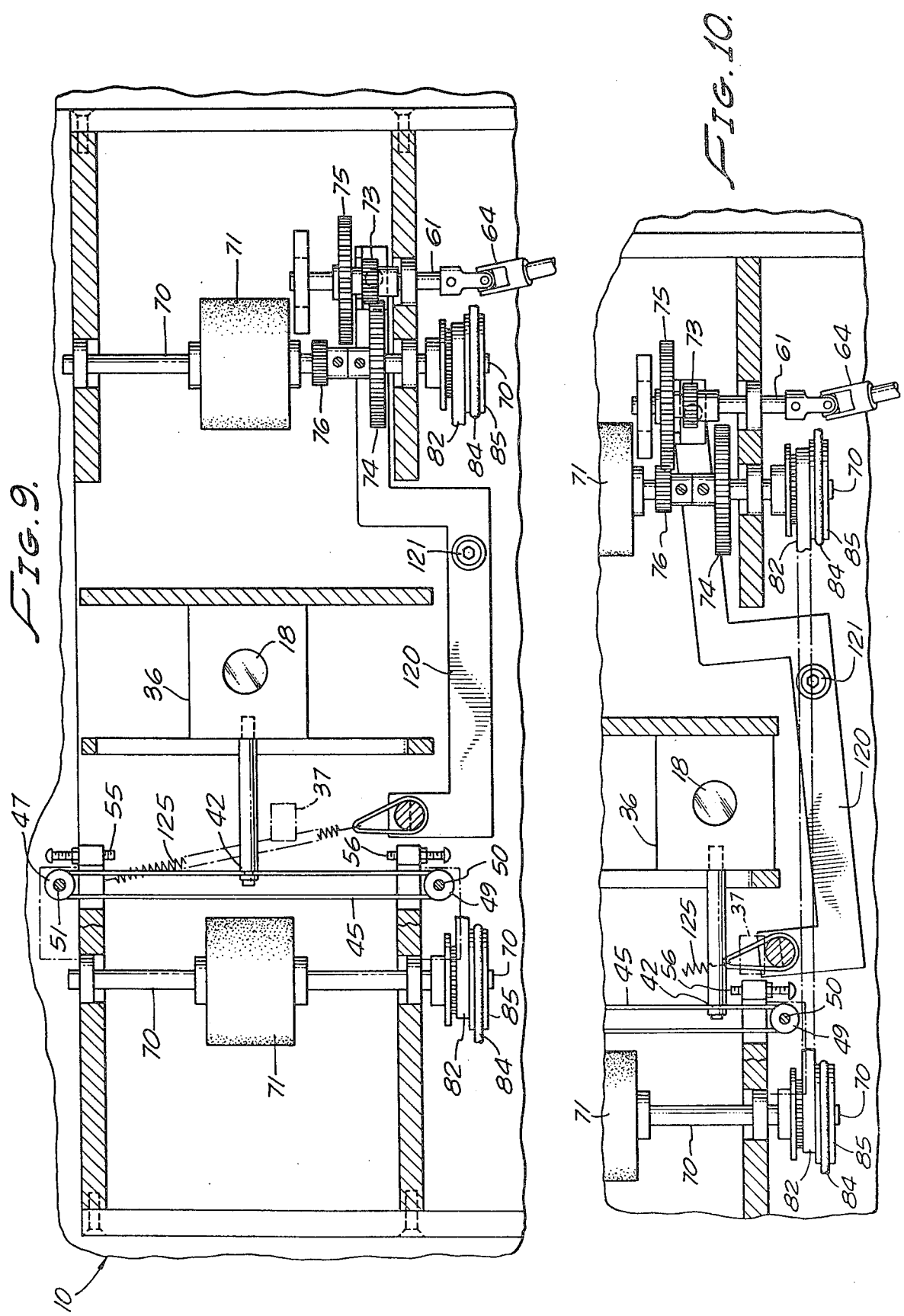

OPTICAL ROLLFICHE READER

CROSS REFERENCE TO RELATED APPLICATION

This application is a continuation of our application entitled OPTICAL ROLLFICHE READER, Ser. No. 141,456, filed Apr. 18, 1980, now abandoned.

BACKGROUND OF THE INVENTION

The present invention relates to an optical film reader for reading information contained on film strips and more particularly to a manually operated optical film reader for projecting and enlarging microcopy information recorded in rollfiche format on rolls of photographic film.

In recent years the rapid increase in the production of written information has resulted in the concomitant problem of efficient information storage and retrieval. In order to reduce the physical volume of documents and other printed material that must be stored and made available for rapid retrieval and inspection, microfilm techniques in which documents, data and other printed matter are photographed in a reduced size have become common. Microfilm containing such information allows for a convenience in storage and transportation as many thousands of printed pages can be contained on a single roll of film. Another attendant advantage of such microfilm techniques is that enlarged prints can be made from the film, or the film can be viewed by projection on a screen or viewer.

In addition to roll microfilm recording of information, microfiche, a sheet of microfilm approximately 4 inches by 6 inches is also used to record microcopy. A single microfiche can contain many pages of microcopy and has an advantage over conventional roll microfilm in that recorded information can be readily indexed with respect to a two coordinate system; along the margins of the fiche or microfilm sheet. Thus information can be rapidly located upon reference to the particular address or horizontal and vertical coordinates of the information when the sheet is placed in a microfiche projection device and viewed.

In order for the information recorded on microfilm or microfiche to be viewed, or enlarged prints obtained the film or fiche must be projected in a viewer or reader. A major disadvantage of prior art viewers and projectors is that they have been expensive, bulky and often complicated to operate. Prior art viewers and readers have required the operator to handle the film or microfiche subjecting it to dust, moisture, scratching of the film and other hazards of mishandling such as misfiling or theft. Another disadvantage of microfilm and microfiche systems found in the prior art is that multiple rolls of microfilm or many individual sheets of microfiche are required to store large quantities of information.

SUMMARY OF THE INVENTION

The present invention relates generally to apparatus for the optical projection and viewing of information contained on photographic film. More particularly, the invention relates to apparatus for the optical projection and viewing of information recorded in rollfiche format on rolls of photographic film or the like.

The advantages of the rollfiche reader of the present invention over that found in the prior art is that: it enables rapid manual scanning of the rollfiche strip in both directions to locate the desired information with instantaneous reversal of the scan direction without backlash in the film drive; it provides a low glare, high contrast viewing screen mounted at 45° to the vertical and placed low at the front of the unit perpendicular to viewer's line of sight; it allows for the scanning of data on rollfiche which is wider than that projectable on a fixed sized screen at one given time at a given magnification ratio; it allows projection of the eye-readable or index area of the film by simply shifting a lever, and it eliminates operator handling of the rollfiche thereby insuring the integrity of the rollfiche and the data contained thereon.

The rollfiche reader of the present invention is comprised of three basic systems; the rollfiches movable projection optics; the rollfiche film transport and rollfiche reader housing assembly.

The movable projection optics provides for vertical scanning of the data area of the rollfiche which is wider than that projectable on a fixed size screen at one given time at a given magnification ratio while the film remains stationary.

The movable optics system possesses a major advantage over that of prior art fiche readers in that during the vertical scan of the fiche, the film and projection lamp remain stationary allowing the unit to be more compact than in conventional readers.

The rollfiche film transport mechanism provides for manually driving a roll of rollfiche film in both directions at either a high speed or low speed by means of a single hand crank. The mechanism is designed to allow instantaneous reversal of the film drive while eliminating all backlash in the film and thereby eliminate breakage to the film caused by sudden reversals in film direction by the operator. Additionally, the film transport mechanism employs a fast scan/slow scan mode to allow rapid location of a particular address or index along the roll and then slow scan of individual microcopy.

A unique feature of the instant invention is the housing assembly and its attendant optics which allow the viewing screen to be mounted at 45° to the vertical and placed low in the front of the unit. Prior art microfiche readers possess vertical viewing screens making sustained viewing tiring to the operator and contribute to the bulkiness of the apparatus.

OBJECT OF THE INVENTION

It is an object of the invention to provide a novel apparatus for the projection and viewing of microcopy information recorded on rolls of photographic film and the like.

Another object of the invention is to provide a rollfiche reader with a viewing screen mounted at 45° to the vertical and placed low at the front of the reader such that the viewing screen is perpendicular to the operator's line of sight when looking down at the unit.

Another object of the invention is to provide a rollfiche reader in which the optical projection system is movable along a direction perpendicular to the direction of film travel.

Another object of the invention is to provide a rollfiche reader which possesses projection optics capable of scanning data on rollfiche film which is wider than that projectable on a fixed sized screen at one given time at a given magnification ratio.

It is still another object of the invention to provide a rollfiche reader in which vertical scanning of the data and eye-readable area of the rollfiche may be scanned by means of a single lever.

It is still a further object of the invention to provide a rollfiche reader in which the roll of readable film may be manually driven in either direction at selected rates of speed.

It is a further object of the invention to provide a rollfiche reader with a film transport mechanism that is instantly reversible and without back lash in the film drive thereby eliminating breakage of the film due to sudden stoppage or reversal of the film drive by the operator.

It is still another object to provide a manually operated rollfiche reader of the type described in the proceeding paragraphs which is compact in size and is highly reliable and efficient yet inexpensive to fabricate and maintain.

In summary, these and other objects of the invention will appear in the following description and appended claims and will be more clearly understood when read with reference to the accompanying drawings.

BRIEF DESCRIPTION OF THE DRAWINGS

FIG. 2 is a side elevational view of the apparatus of the invention taken along lines 2—2 of FIG. 1 illustrating the movement of the optic projection system and the optic path through the system;

FIG. 9 is a fragmentary plan view taken along lines 9—9 of FIG. 4 illustrating the slow scan/fast scan rollfiche film drive mechanism in slow scan position;

FIG. 10 is a fragmentary plan view similar to FIG. 9 but illustrating the slow scan/fast scan rollfiche drive mechanisms in fast scan position;

DESCRIPTION OF THE PREFERRED EMBODIMENT

Referring to FIGS. 1-4 of the drawings, one form of the apparatus is shown as comprising several operative associated subassemblies or subsystems which cooperate to enable the scanning of the photographic microcopy on rollfiche and projection of the enlarged image onto a viewing screen.

Figure 1:
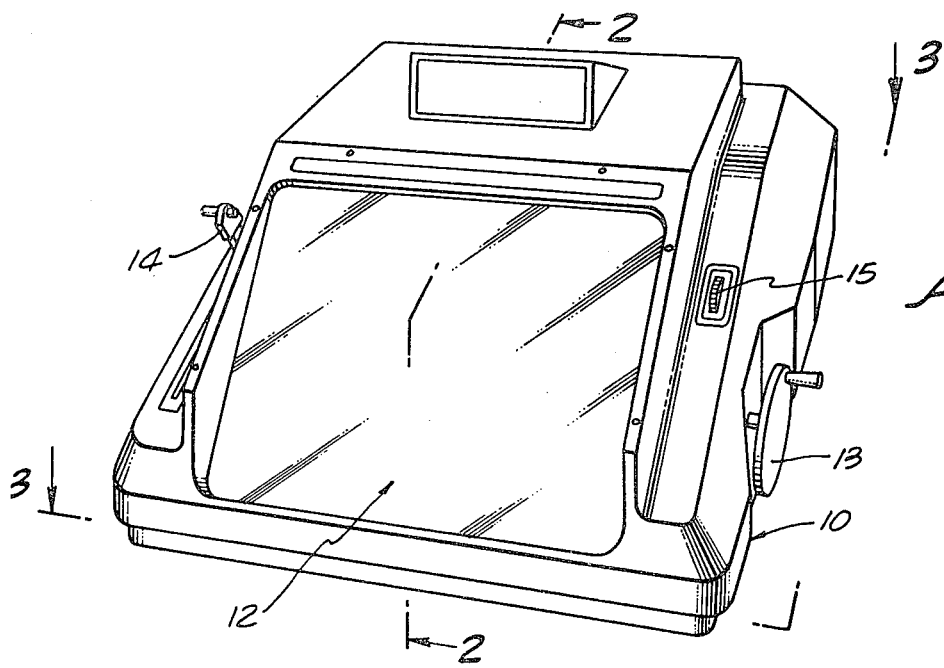
FIG. 1 is an oblique view of the exterior housing and viewing screen of the preferred embodiment of the invention.
Figure 7:
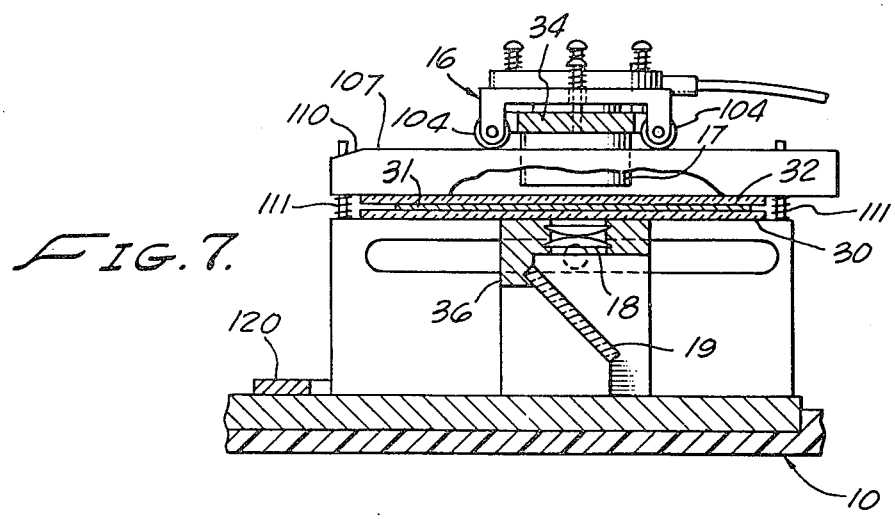
FIG. 7 is a fragmentary side elevational view taken along lines 7—7 of FIG. 6 illustrating the movable projection optics in the read position such that the data section of the rollfiche is projected onto the viewing screen.

As shown in FIG. 1, the rollfiche reader of the present invention consists of a housing assembly 10 which contains a viewing screen 12 mounted at 45° to the vertical and placed at the front of the unit. Mounted on the right side of housing assembly 10 is the film drive crank 13 for scanning the rollfiche in either direction along the length of the film roll and the focus control knob 15 for focusing the projected microcopy on the viewing screen 12. Located on housing 10 to the left of the viewing screen 12 is the vertical film scan and slow scan/fast scan shift lever 14 which enables vertical scanning of the rollfiche perpendicular to the direction of film travel and shifting of the film drive gearing from high speed scan to low speed scan.

Referring to FIG. 2, the vertical film scan and slow scan/fast scan shift lever 14 operates the movable carriages 16 containing the projection optics 17, 18 and 45° mirror 19 by means of a cable connection 20. By moving lever 14 the movable projection optics can be made to scan the width of the rollfiche film, perpendicular to the direction of film travel, thereby causing the recorded microcopy to be projected onto the viewing screen 12 by projection of the microcopy image first onto a front surface mirror 22 which reflects the image onto a second trapezoidal front surfaced mirror 23 which reflects the projected image onto the viewing screen 12.

A unique feature of the present invention over that found in the prior art is that the viewing screen 12 is mounted at 45° to the vertical and placed low at the front of the reader. This configuration puts the viewing screen 12 at an ideal position, being close to the observer at an angle perpendicular to the line of sight when looking down at the unit. To enhance the contrast of the projected image, screen 12 is constructed of a "venetian blind" like material. These tightly spaced venetian blinds included in the screen material allow only those light rays substantially perpendicular to the screen to pass through. Stray light from outside and inside the unit that is not perpendicular to the screen surface is blocked. Thus, the potential problem of glare created by mirror 23, due to light entering through screen 12 and being reflected back up onto screen 12 and also into the viewer's eyes is eliminated by use of the "venetian blind" screen material.

Figure 3:
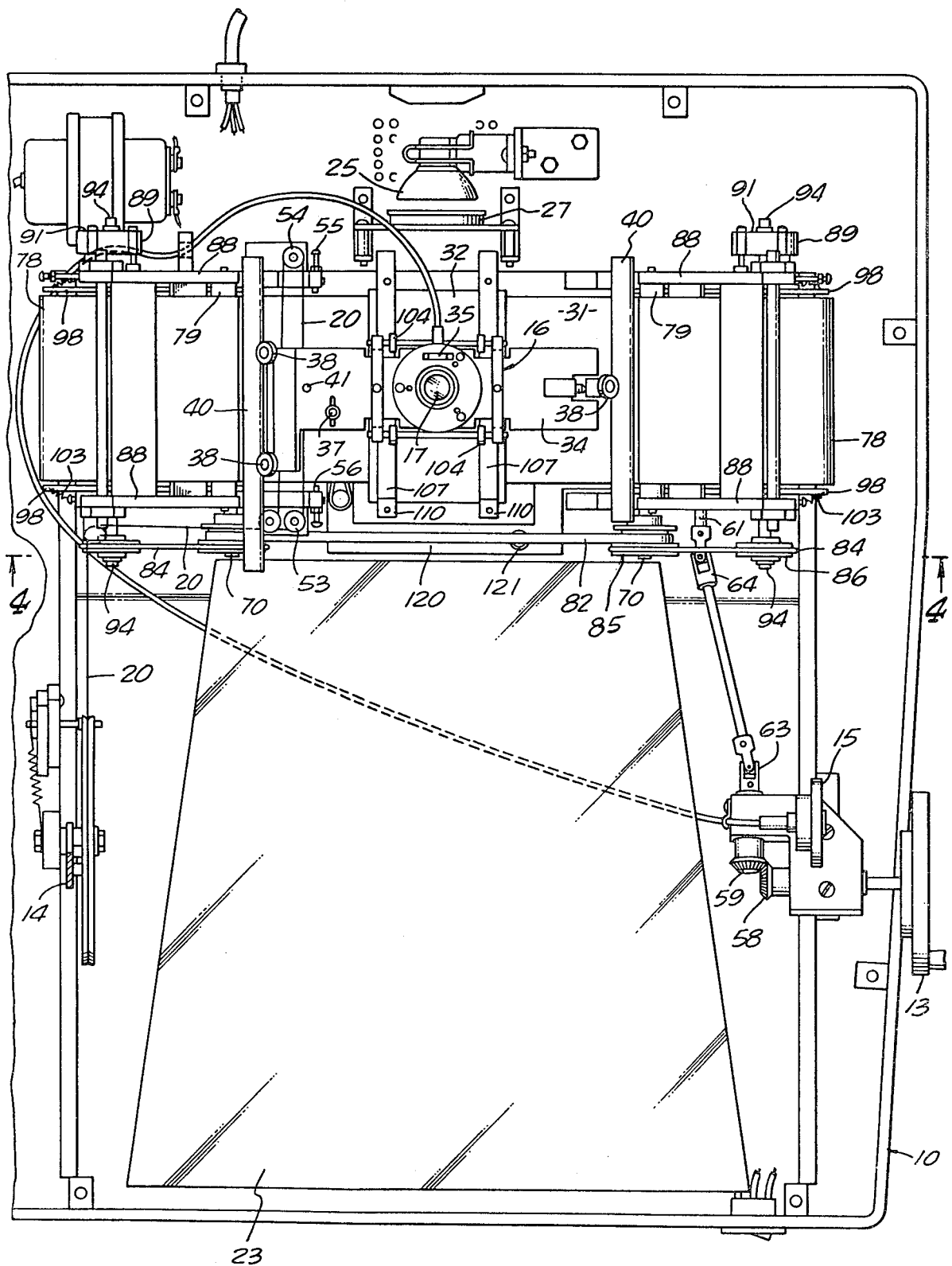
FIG. 3 is a plan view of the invention taken along lines 3—3 of FIG. 2 illustrating the movable projection optics, film transport mechanism and trapezoidal projection mirror.

Such screen material is disclosed in the Olsen Reissue Pat. No. 27,617, Apr. 17, 1973, and the two patents to Appeldorn et al., Nos. 3,972,593 and 4,082,433, granted Aug. 3, 1976 and Apr. 4, 1978, respectively. Each of these patents is hereby incorporated by reference. FIG. 3 of Olsen shows in cross-section "venetian blind" type screen material, as do FIGS. 8 of the Appeldorn et al. patents.

Figure 11:
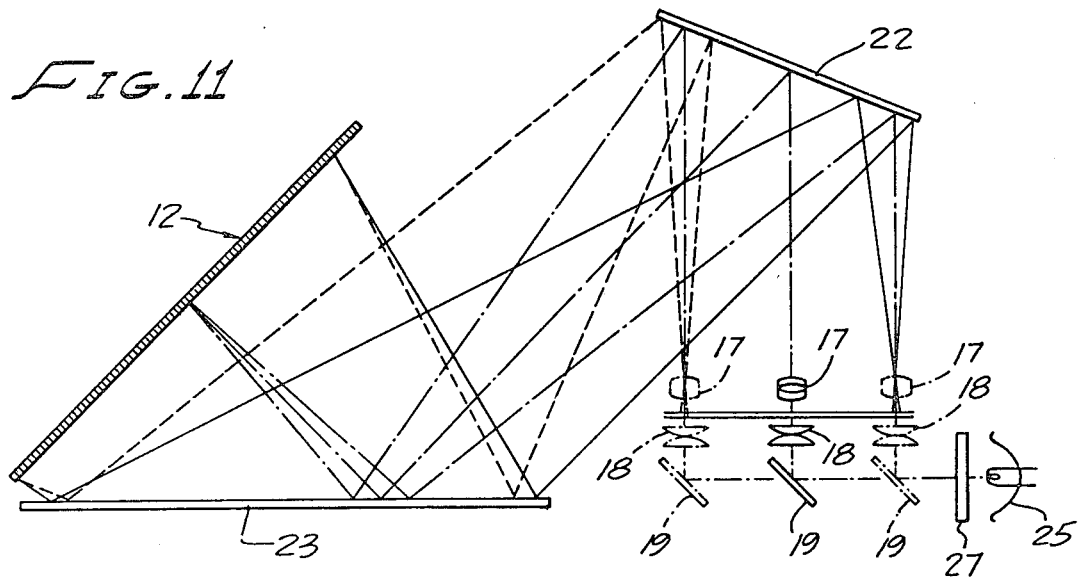
FIG. 11 is a schematic side elevational view of the movable projection optics of the invention illustrating the optical paths of projected microcopy when the projection optics are moved across the rollfiche perpendicular to the direction of film travel.

Referring to FIGS. 2 and 11, projection light is provided by a miniature tungsten-halogen lamp or the like with an integrally mounted dichroic reflector 25. An infra-red filter 27 is interposed in the light path to preclude heat damage to the film. Mirror 19 directs the projected light through condenser lenses 18 contained in the movable projection optics assembly 16 and through glass platen 30, the film 31, and the glass platen 32. A focusable projection lens 17 images the microcopy contained on film 31. Front surface mirrors 22 and 23 reflect and enlarge the projected microcopy image onto screen 12 where it is viewed.

An important feature of the instant invention is the movable projection optics assembly 16 as illustrated in FIGS. 3–6. Assembly 16 allows the operator to scan the rollfiche film 31 perpendicular to the direction of film travel without moving the film by moving scan lever 14. As shown in FIGS. 5–8 the projection lens 17, condenser lens 18 and mirror are all arranged to move together on two mechanically interconnected carriages 34 and 36. The upper carriage assembly 34 carries projection lens 17, the projection lens focus eccentric 35, the adjustable boss 37 for the high speed/slow speed scan gear change mechanism, the six guide rollers 38 which guide the upper assembly along the upper carriage tracks 40, and the connecting clamp 41 to the film scan lever control cable 20.

As shown more clearly in FIGS. 9 and 10 the lower carriage assembly 36 carries the condenser lenses 18, the mirror 19 and the clamp 42 connecting the lower carriage to cable 45.

Movement of the upper and lower carriage assemblies are controlled by the scan lever 14 which is interconnected to the upper carriage assembly 34 by means of cable 20. Thus the operator can scan the width of the rollfiche 31 by moving the scan lever 14 in either direction causing individual microcopy contained thereon to be projected onto the viewing screen 12.

Figure 5:
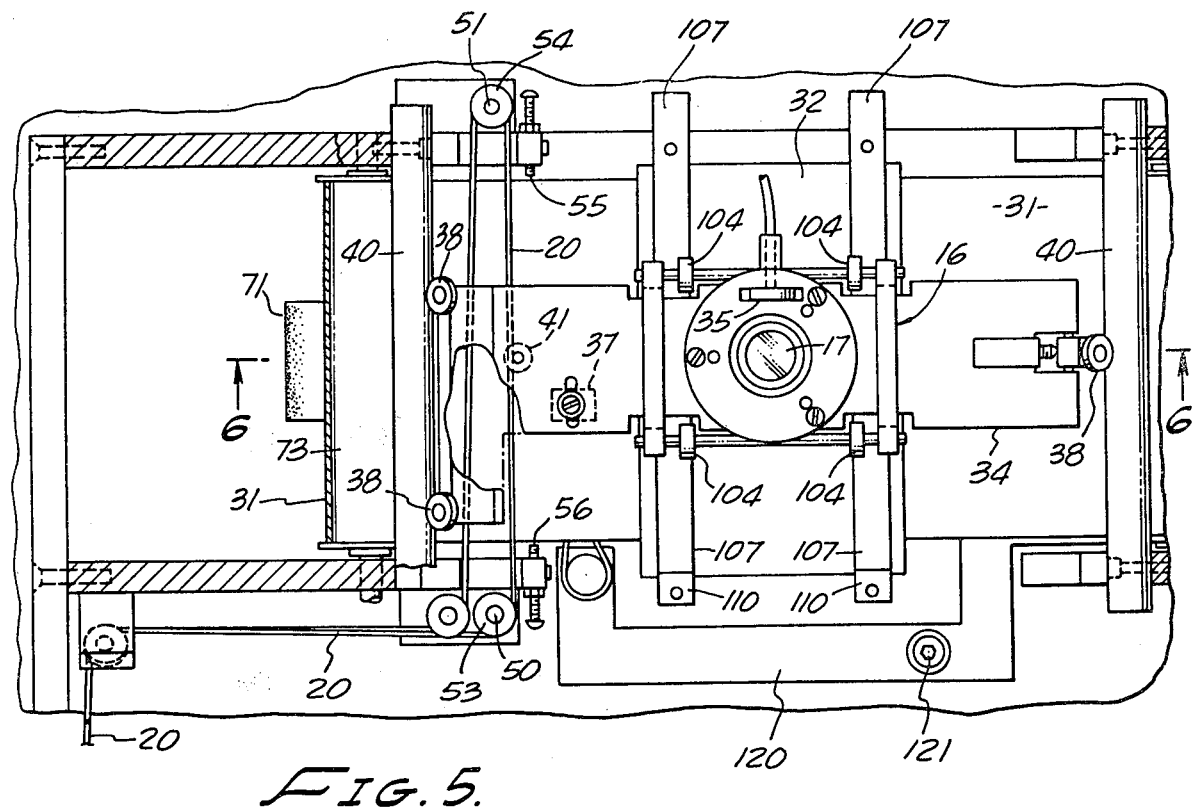
FIG. 5 is a fragmentary plan view taken along lines 5—5 of FIG. 4 further illustrating the movable projection optics.
Figure 6:
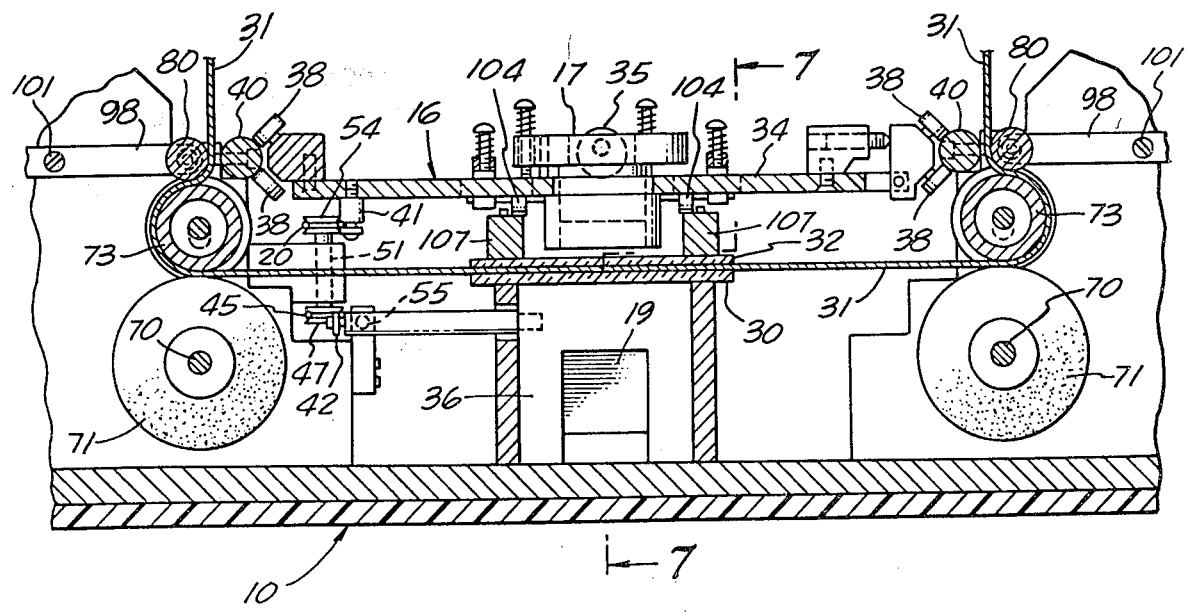
FIG. 6 is a fragmentary front elevational view taken along lines 6—6 of FIG. 5 further illustrating details of the movable projection optics and film transport mechanisms.

As more clearly seen in FIGS. 5, 6, and 9, the lower carriage assembly 36 is mechanically interconnected to the upper carriage assembly 34 by means of a clamp 42 on closed loop cable 45 so that the projection lens is always centered on the condenser lens 18 and the upper and lower carriage assemblies 34 and 36 are kept in synchronization by cables 20 and 45 running on pulleys 47, 54 and 49, 53 pinned to opposite ends of transfer shafts 50 and 51. To assure that the projection lens 17 contained in the upper carriage assembly 34 is always in exact synchronization with the condenser lens 18 and mirror 19 carried by the lower carriage assembly 36 independent of the amount of heavy use and possible slippage of the cables 20 and 45 on the pulleys 47, 54 and 49, 53, and automatic alignment mechanism consisting of stop screws 55 and 56 is provided.

As shown in FIGS. 5, 9 and 10 either end of the travel of the upper and lower carriages 34 and 36 is limited by adjustable stop screws 55 and 56. If the lower carriage assembly 36 is out of synchronization in the forward direction, it will come against stop screw 56 before the upper carriage 34 reaches its forward limit. Further forward movement of the vertical scanning lever 14 moves only the upper carriage assembly 34 until it reaches its forward limit and the two carriage assemblies 34 and 36 are in exact synchronization. Likewise, if the lower carriage assembly 36 is out of synchronization in the rearward direction, stop screw 55 arrests its movement and the upper carriage 34 is brought into alignment by continued movement of the vertical scan lever 14 toward its rearward limit.

Figure 4:
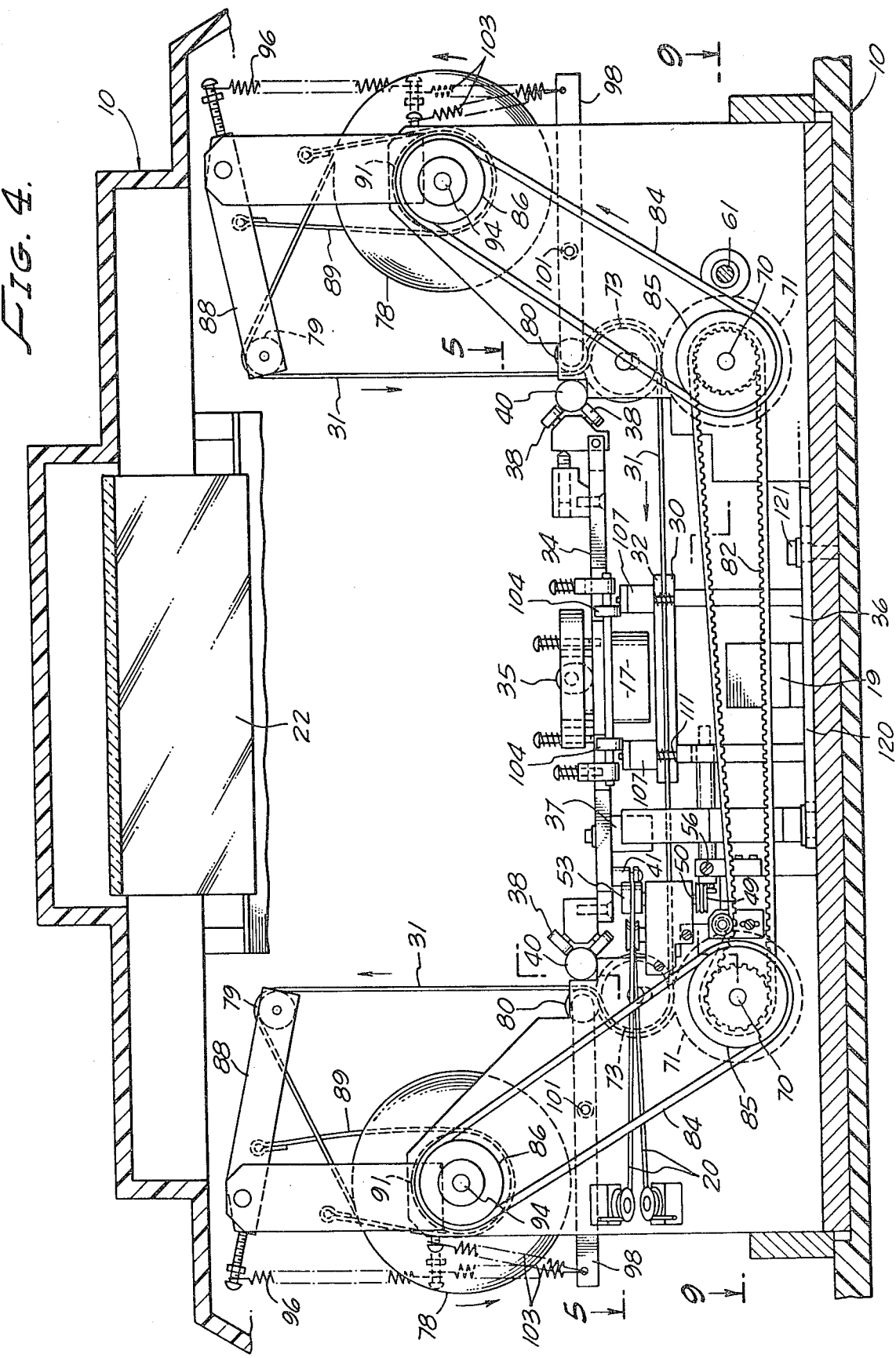
FIG. 4 is a front elevational view of the invention taken along lines 4—4 of FIG. 3 illustrating the movable projection optics and film transport mechanism.

Referring particularly to FIGS. 3 and 4 of the drawings the novel film transport means of the invention is disclosed for driving a roll of film in either direction by means of a single hand crank 13. A unique feature of the drive mechanism is its ability to reverse direction instantly without backlash or slippage of the film. As will be discussed later in greater detail, FIGS. 3, 9 and 10 show how the drive force is transmitted from the hand crank 13 to the drive roller 71.

Referring to FIG. 4, the basic film transport system employs a pair of drive rollers 71 and a pair of pinch rollers 73 on the right and left side of the projection optics. These rollers keep the film 31 under positive control as it is being driven between the glass platens 30 and 32 and minimizes the backlash in the system.

The rollfiche film 31 feeds off supply/take up roller 78, over a brake roller 79 around a pressure roller 80 and pinch roller 73. The pressure roller 80 is connected to lever arms 98 which are pivoted about shaft 101 and biased by springs 103 thereby causing the film 31 to be held against the pinch roller 73 and feed positively against rubber drive roller 71. The rubber drive roller 71 propels the film 31 through the movable projection optics assembly and between two glass platens 30 and 32 which guide and maintain the rollfiche within the depth of field of the projection optics when the film is scanned or read across its width. The film 31 then passes over a corresponding left hand drive roller 71, pinch roller 73, pressure roller 80, brake roller 79, and accumulates on supply/take up roller 78. These elements on the left hand side of the unit are duplicates of those on the right hand side and perform the same functions when the film drive direction is reversed.

The two rubber drive rollers 71 are connected by a toothed drive belt 82. Accordingly, both drive rollers 71 are driven directly, and are synchronized. The result is that the film 31 is positively transported through the projection optics and between glass platens 30 and 32 so that it always remains tight as shown in FIG. 6 of the drawings.

Figure 12:
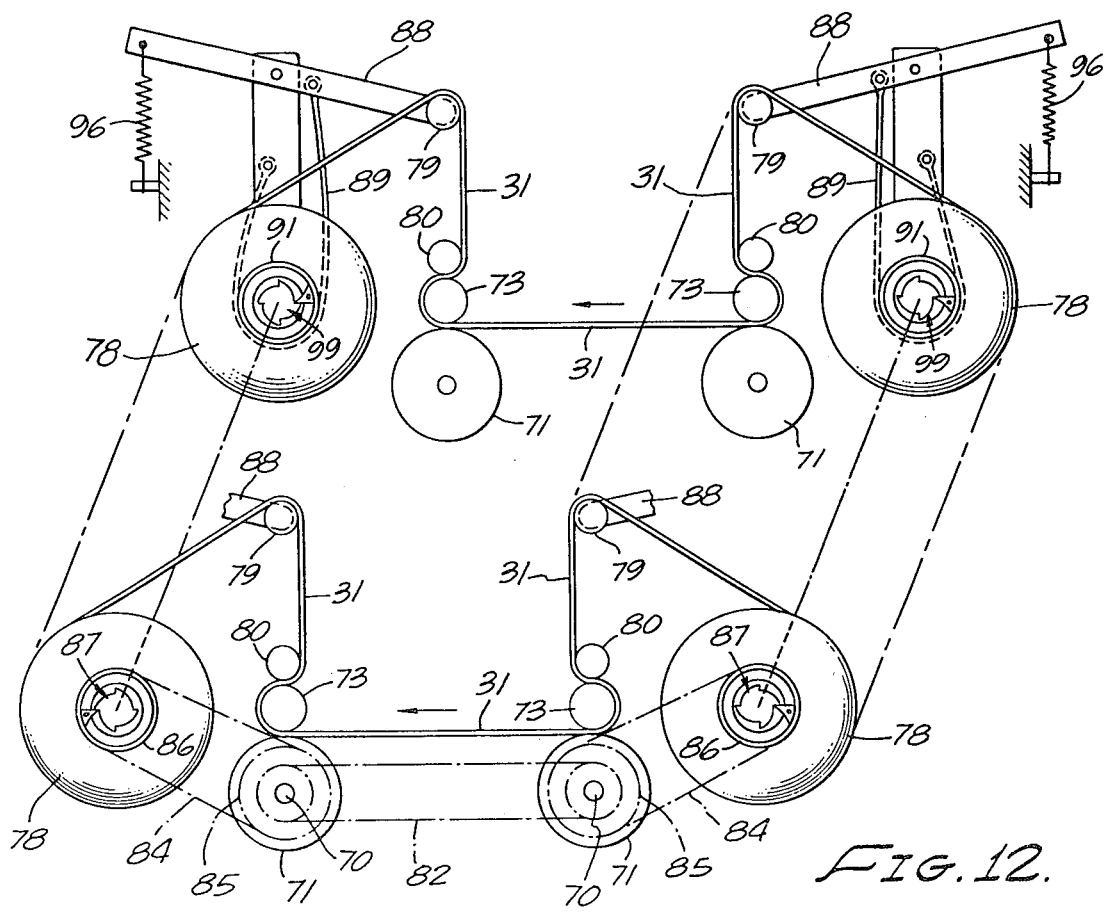
FIG. 12 is a fragmentary front perspective view of the rollfiche transport system illustrating the film drive and film tensioning one way clutch mechanism of the film transport system.

As illustrated in FIG. 4 and more particularly in FIG. 12 of the drawings the supply/take up rollers 78 are driven by O-ring belts 84 from the drive roller shafts 70. The pulleys 85 and 86 for these belts are sized so that the supply/take up rollers 78 are driven at a slightly faster rate than the drive rollers 71. In addition, pulleys 86 on the supply/take up rollers 78 each contain a one way clutch 87 as shown in FIG. 12 so that the O-ring belts 84 effectively drive only when a given roller 78 is being used as a takeup roller. Since the takeup roller 78 cannot be driven any faster than the film 31 is fed through the drive rollers 71, the O-ring belt 84 slips. In the process of slipping it maintains a positive tension on the film so that no slack in the film 31 is allowed to develop. This tension also serves to keep the film tight in between the drive rollers 71. The one way clutches 87 are necessary as the O-ring belts 84 are designed to drive the supply/take up rollers 78 faster than the film is actually used. The one way clutches 87 prevent whichever one of the supply/take up rollers 78 which is functioning as the supply roller 78 from being driven and creating slack in the film 31 as it travels through the transport mechanism.

Referring to FIGS. 3, 4 and 12, the film 31 as it is transported from a supply roller 78, to a corresponding take up roller 78 on the other side of the apparatus is prevented from overrunning or developing slack by the brake rollers 79 and brake bands 89. The brake rollers 79 are connected to lever arms 88 which act on brake bands 89 in frictional contact with brake drums 91. The brake drums 91 are connected to the shaft 94 of each film supply/take up roller 78. The brake bands 89 are designed to prevent overrun of a film supply roller 78 when the system is operated in the high speed mode and suddenly brought to a halt. The levers 88 holding the brake rollers 79 are biased by springs 96. If there is any slack in the film 31, the levers 88 move outward in response, tightening the brake bands 89 on the brake drums 91 preventing over run by the supply roller 78 and act as snubbers to absorb shock induced by uneven cranking or quick reversal in drive direction. In addition the brake drums 91 are attached by one way clutches 99 to the film roller shafts 94. The one way clutches 99 are constructed such that the brake bands 89 are only effective when the film roller 78 is used as a supply roll. In this way any slack in the film due to supply run overrun will bring the film supply roll 78 to a quick halt. The corresponding take up roller 78 will not be affected due to the operation of the one way clutch 99 which allows it to move as long as there is any movement of the film.

Referring to FIG. 3, the drive force for the film transport mechanism is provided by a hand crank 13, however, in alternate embodiments of the invention electrical motors and the like may be used to supply power to the system. Power is transmitted from crank 13 to the right hand drive roller 71 by means of beveled gears 58 and 59, through two U-joints 63 and 64 to the splined drive shaft 61.

As shown in detail in FIGS. 9 and 10 of the drawings the drive force is transmitted from drive shaft 61 to the right hand roller shaft 70 and roller 71 through a set of slow scan/fast scan step gears 73, 74, 75 and 76 which are selectively meshed for either a low speed or a high speed scan mode.

With the movable optics in the read position as shown in FIG. 9, such that microcopy is projected onto the viewing screen, step gears 73 and 74 are engaged allowing the operator to slowly scan along the length of the rollfiche by rotating hand crank 13. To engage the high speed scan mode the vertical scan lever 14 is moved to the extreme (detent) position toward the operator as shown in FIG. 2. The movement of lever 14 to the high speed scan mode position causes the movable projection optics 16 to move to the edge of the rollfiche film nearest the operator. As further shown in FIG. 8 at this position, two of the four glass plated pressure rollers 104, carrying the upper optics carriage assembly 34 and bearing on the glass platen pressure rails 107, ride down inclines 110 on the front of pressure rails 107 and cause the glass platen pressure rails 107 and a portion of the upper carriage assembly 16 to pivot. The combination of the displacements of the four glass platen pressure rollers 104 eliminate all downward pressure on the glass platen rails 107, which are biased in the upward position by springs 111. The rails 107 move upward and the glass platens 30 and 32 open. The springs 111 which bias the rails 107 are of equal force, but, the rear edge of the glass platen opens to a greater degree than the front edge, as the front edge is somewhat restrained by the two glass platen pressure rollers 104 on the incline 110 of the glass platen pressure rails 107. This unequal amount of glass platen lift is designed to retain the front edge of the rollfiche film in a position so that the "eye readable" or large indexing type which is commonly displayed on the margin of the film is held in close control vertically and thus within the depth of focus of the projections lens so that it can be viewed during the high speed scan mode. The opening of the glass platens 30 and 32 in the high speed mode prevents wear to the film surface and dirt and dust buildup.

Figure 8:
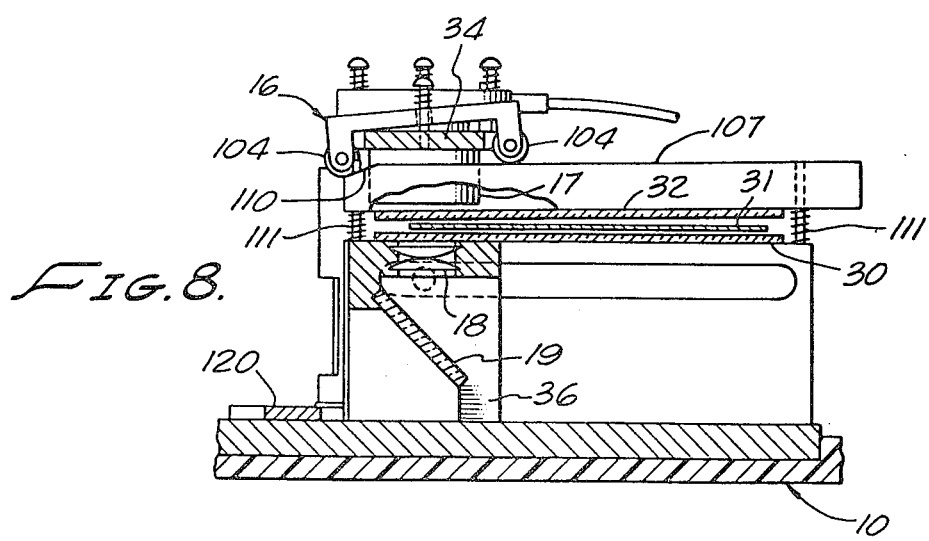
FIG. 8 is a fragmentary side elevational view similar to FIG. 7 illustrating the movable projection optics in the fast scan drive position in which the glass platen film guides are canted open to prevent wear to film surfaces.

As illustrated by FIG. 9, also when the vertical scan lever 14 is moved into the high speed scan mode position, in addition to the glass platens 30 and 32 opening as described above, a gear ratio change of 9:1 is accomplished to enable scanning of film at a high rate of speed. The gear change from slow speed scan to high speed scan is affected by movement of the upper and lower optics carriage assemblies 34 and 36 forward to the extreme front of the unit as shown in FIG. 8. In this position as illustrated in FIG. 10, an adjustable boss 37 mounted on the underside of the upper carriage assembly 34 engages the spring biased gear shift lever 120 causing it to rotate about pivot 121. The other end of shift lever 120 contains a yoke which pushes the drive gears 73 and 75 splined to the drive shaft 61 along the shaft, meshing drive gear 75 with gear 76 pinned to the right hand roller shaft 70 and thereby shifts the film drive into the high speed scan mode. Moving the carriage from the "eye readable" area of the film to the data area of the film allows the biasing spring 125 to return the gear shift lever 120 to the slow scan position which engages the low speed gears 73 and 74.

From the foregoing description, it is believed that it will be appreciated that the heretofore outlined objects of the invention will be attained, and that the apparatus embodying the described features provides inherent advantages in the projection and reading of microcopy recorded on photographic film.

Various modifications may suggest themselves to those skilled in the art without departing from the spirit of the disclosed invention, and hence, it is not wished to be restricted to the specific forms shown or uses mentioned except to the extent indicated in the appended claims.

We claim:

1. An apparatus for the viewing of microcopy recorded on photograph film or the like comprising:
    (a) a pair of supply/takeup rollers spaced apart and providing a projection zone in that portion of the film which passes from one roller to the other,
    (b) means in said projection zone for optically projecting and enlarging a selected area of said microcopy to project an enlarged image of said area,
    (bb) screen means for viewing the enlarged projected microcopy image,
    (c) film driving means on opposite sides of said projection zone for driving said film therethrough in either direction,
    (d) tensioning means responsive to slack in the film positioned between said driving means and said supply/takeup rollers for tensioning said film to eliminate slack in said film to allow instantaneous reversal of driving said film without backlash,
    (e) brake means operatively connected to the tensioning means for engaging said supply/takeup rollers when excessive tension is present in the film, and
    (f) clutch means mounted on said supply/takeup rollers such that said brake means engages a supply/takeup roller only when such roller is used as a supply roller and film is being withdrawn therefrom.

2. A combination as defined in claim 1 in which said projection means includes:
    (a) a light source means,
    (b) first mirror means to direct light from said light source means to illuminate a selected portion of said film, (c) lens means for imaging and projecting said microcopy recorded on said film, (d) second and third mirror means to reflect and enlarge said projected microcopy image onto said viewing screen means such that the projected microcopy image fills said viewing screen means.

3. The combination as defined in claim 2 in which:

(a) said film driving means further includes a pair of drive rollers disposed spaced apart on either side of said projection zone and a pair of pinch rollers spaced apart on either side of said projection zone so that said film is forced against said drive rollers by said pinch rollers, (b) means interconnecting said drive rollers so that they are synchronously driven to positively transport said film in either direction past said lens means, and (c) film guide means positioned to direct said film from said drive rollers through the optic path of said lens means and maintain said film within the depth of field of the projection optics.

4. The combination as defined in claim 3, in which:

(a) said film guide means comprises upper and lower glass platens and said lens means is movable to be disposed over a marginal edge of the film, (b) spring biasing means interposed between said platens, (c) said spring biasing means of sufficient strength so that one edge of said upper platen separates unequally from said lower platen so that the edge of the upper platen opposite said marginal edge of the film is farther from the film than the edge of the upper platen adjacent the marginal edge when said movable lens means is positioned along said margin of said film, and (d) said unequal separation of said platens retains the edge of said film within the depth of focus of said lens means to allow projection of index data displayed on the margin of said film.

5. The combination as defined in claim 3, in which:

said film guide means comprises upper and lower glass platens, and said lens means is movable to be disposed over a marginal edge of the film to allow projection of index data displayed on the margin of said film.

6. The combination as defined in claim 1 in which:

(a) said projection means further includes scanning control means for causing said first mirror means and lens means to move in synchronization across said film in a direction perpendicular to the direction of film travel to allow scanning and selective projection of microcopy recorded on a roll of film which is wider than that projectable on a fixed size screen at one given time at a given magnification ratio.

7. The combination as defined in claim 6 in which:

(a) said screen is mounted on an incline to the vertical and placed low in the front of said housing means such that said screen is perpendicular to the operator's line of sight when looking down at said screen, and (b) said screen possessing means for allowing only light rays substantially perpendicular to said screen to pass through, such that stray light from inside or outside said apparatus that is not perpendicular to the screen surface is not transmitted.

8. The combination as defined in claim 7 in which:

(a) said tensioning means includes means interconnecting said drive rollers and said supply/takeup rollers for driving said supply/takeup rollers at a rate faster than said drive rollers only when a given roller is being used as a takeup roller.

9. An apparatus for viewing of microcopy recorded on rolls of photographic film or the like comprising:

(a) two supply/takeup means disposed spaced apart for holding said film, (b) movable projection means positioned between sand supply/takeup means for optically projecting and enlarging said microcopy recorded on said film, (c) screen means for viewing the enlarged projected microcopy image which only transmits light rays substantially perpendicular to said screen, (d) control means for causing said movable projection means to move across said film in a direction perpendicular to the direction of film travel to allow scanning and selective projection of microcopy recorded on a roll of film which is wider than that projectable on a fixed size screen at one given time at a given magnification ratio, (e) optic means for further projection and enlargement of selected microcopy imaged by said movable projection means so that the projected image of said microcopy fills said viewing screen means, (f) film transport means for driving said film in either direction between said supply/takeup means and past said projection means, (g) tensioning means for keeping said film under continuous tension in said transport means so as to eliminate slack in said film allowing instantaneous reversal in drive directions of said film without backlash, including brake and clutch means connected to each of said two supply/takeup means so that the brake means is effective only when the associated supply/takeup means has film withdrawn therefrom, and (h) housing means for containing said screen means, instrument controls and enclosing said apparatus.

10. An apparatus for reviewing microcopy recorded on rolls of photographic film or the like comprising:

(a) a pair of supply/takeup rollers disposed spaced apart for holding said film, there being a projection zone in that portion of the film which passes from one roller to the other, (b) film transport means for driving said film in either direction between said supply/take rollers and through said projection zone, said film transport means including tensioning means to eliminate slack in said film and allowing instantaneous reversal in driving direction of said film without backlash, (bb) means for optically projecting and enlarging the microcopy recorded on said film, (c) film guide means positioned to guide said film through said projection zone, said film guide means comprising upper and lower platens, (d) spring biasing means interposed between said platens, said spring biasing means having associated means so that one edge of said upper platen separates from said lower platen to a greater degree than the opposite edge of said upper platen when a movable lens of said means for optically projecting and enlarging said microcopy is positioned along the margin of said film and said unequal separation of said platens retains the edge of said film with the depth of focus within said lens to allow projection of index information displayed on the margin of said film.

11. An apparatus for viewing of microcopy recorded on rolls of photographic film or the like, comprising:
  (a) a pair of supply/takeup rollers spaced apart, there being a projection zone in this portion of the film which passes from one roller to the other;
  (b) means in said projection zone for optically projecting and enlarging a selected area of said microcopy recorded on said film;
  (c) film driving means on opposite sides of said projection zone for moving said film therethrough in either direction and from one supply/takeup roller to the other;
  (d) brake means for each of said supply/takeup rollers operable to slow the rotation of said supply/takeup rollers when said supply/takeup roller is being used as a supply roller and the film is being withdrawn therefrom; and
  (e) clutch means for each of said supply/takeup rollers for allowing the associated brake means to only function when said supply/takeup roller is being used as a supply roller.

12. A combination as defined in claim 11 in which said brake means is controlled by the film extending between said supply/takeup rollers and said film drive means.

13. A combination as defined in claim 11 in which said brake means is controlled by the tension or slack in the film between said supply/takeup rollers and said film drive means.

14. An apparatus for reviewing microcopy recorded on rolls of photographic film or the like comprising:
  (a) a pair of supply/takeup rollers disposed spaced apart for holding said film, there being a projection zone in that portion of the film which passes from one roller to the other,
  (b) film driving means for driving said film in either direction between said supply/takeup rollers and through said projection zone,
  (c) film supply/takeup roller drive means for turning said rollers in a direction to wind the film thereon,
  (d) means operable by said film extending between said film driving means and said supply/takeup rollers to relieve slack in said film between said film driving means and said takeup rollers,
  (e) slowing means for each of said pair of supply/takeup rollers, and
  (f) clutch means for allowing operation of the slowing means only when the associated supply/takeup roller is being used as a film supply roller.

15. A combination as defined in claim 14 in which said supply/takeup roller when used as a takeup roller is rotated to move said film faster than it is moved by said film driving means, including slippage means for slowing said roller to relieve excess tension in the portion of said film extending between said film driving means and said takeup roller.

16. A combination as defined in claim 15 in which said slowing means comprises brake means operable by the film extending between said supply roller and said film driving means.

17. A combination as defined in claim 15 in which said slowing means comprises a brake means for each supply/takeup roller which releases when said film between a roller and film driving means becomes slack and which tightens when the film between a roller and said film driving means is placed under undue tension.

18. Apparatus for viewing microcopy recorded on rolls of films or the like, comprising:
  (a) a pair of supply/takeup rollers spaced apart and holding the film between them so that the film passes from one roller in said pair to the other roller in said pair through a projection zone,
  (b) drive means for the supply/takeup rollers for rotating said rollers in the same direction, said drive means including clutch means for each of the supply/takeup rollers which is operable to turn a roller associated therewith when the film is being wound upon said roller, whereby only this said one roller is driven by the drive means,
  (c) means responsive to tension in the film for controlling the withdrawal of the film from a supply/takeup roller when film is being withdrawn therefrom in a manner to control the tension in the film as it leaves the roller and moves through the projection zone,
  (cc) clutch means for said tension responsive means to permit operation thereof only when a supply/takeup roller is being used as a film supply roller,
  (d) projecting means for optically projecting and enlarging a selected area of the information on the microcopy, and
  (e) a viewing screen on which said selected area is projected.

19. The apparatus of claim 18 wherein the means for controlling the withdrawal of film includes a pair of pivotably mounted members coupled to braking means for the drive means, said pivotally mounted members engaging the film and pivoting to activate the braking means in response to tension in the film.

* * * * *